(12) United States Patent
Taipale

(10) Patent No.: US 8,213,546 B2
(45) Date of Patent: Jul. 3, 2012

(54) SYSTEM AND METHOD FOR DECODING RDS/RBDS DATA

(75) Inventor: Dana Taipale, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1222 days.

(21) Appl. No.: 11/939,337

(22) Filed: Nov. 13, 2007

(65) Prior Publication Data

US 2009/0124230 A1 May 14, 2009

(51) Int. Cl.
*H04L 27/06* (2006.01)
(52) U.S. Cl. ............... 375/324; 375/326; 375/340
(58) Field of Classification Search ............... 375/259, 375/316, 324, 329, 340; 455/296, 323, 324, 455/337, 341
See application file for complete search history.

(56) References Cited

U.S. PATENT DOCUMENTS

| | | | |
|---|---|---|---|
| 4,821,270 A | | 4/1989 | Mauge |
| 5,399,987 A | * | 3/1995 | Yamamoto et al. ............ 329/306 |
| 5,414,384 A | * | 5/1995 | Hegeler ............ 329/304 |
| 5,745,503 A | | 4/1998 | Kuusinen |
| 5,777,511 A | * | 7/1998 | Masumoto et al. ............ 329/304 |
| 6,038,434 A | * | 3/2000 | Miyake ............ 455/186.1 |
| 6,118,831 A | * | 9/2000 | Masumoto et al. ............ 375/340 |
| 6,256,359 B1 | * | 7/2001 | Masumoto et al. ............ 375/333 |
| 7,095,807 B2 | * | 8/2006 | Noeske et al. ............ 375/330 |
| 7,230,976 B2 | * | 6/2007 | Holt et al. ............ 375/150 |
| 7,282,655 B2 | * | 10/2007 | Satoh et al. ............ 177/210 EM |
| 7,340,230 B2 | | 3/2008 | Khoini-Poorfard et al. .. 455/132 |
| 7,424,071 B2 | * | 9/2008 | Allpress et al. ............ 375/343 |
| 7,716,561 B2 | * | 5/2010 | Belogolovyi et al. ......... 714/780 |
| 7,861,131 B1 | * | 12/2010 | Xu et al. ............ 714/752 |
| 7,864,893 B2 | * | 1/2011 | Taipale et al. ............ 375/329 |
| 8,060,066 B2 | * | 11/2011 | Gregg et al. ............ 455/414.1 |
| 2002/0174376 A1 | * | 11/2002 | Classon et al. ............ 714/4 |
| 2002/0196872 A1 | * | 12/2002 | Noeske et al. ............ 375/329 |
| 2006/0215791 A1 | * | 9/2006 | Noeske et al. ............ 375/333 |

(Continued)

FOREIGN PATENT DOCUMENTS

EP 0567799 A1 3/1993

(Continued)

OTHER PUBLICATIONS

Lin et al., Digital RDS Demodulation in FM Subcarrier Systems, 2004, Circuits and Systems, 2004. Proceedings. The 2004 IEEE Asia-Pacific Conference on, vol. 1, pp. 221-224.*

(Continued)

*Primary Examiner* — Lawrence B Williams
(74) *Attorney, Agent, or Firm* — O'Keefe, Egan, Peterman & Enders, LLP

(57) ABSTRACT

A method performed by a receiver is provided. The method includes generating an RDS/RBDS candidate codeword from a set of RDS/RBDS symbols where the RDS/RBDS candidate codeword has a subset of RDS/RBDS values that differs from corresponding subsets of RDS/RBDS values in all other possible RDS/RBDS codewords and determining whether the RDS/RBDS candidate codeword meets an acceptance criterion by comparing a first subset of reliability values determined from the set of RDS/RBDS symbols and having signs that differ from corresponding signs in the subset of RDS/RBDS values with a second subset of reliability values determined from the set of RDS/RBDS symbols and mutually exclusive with the first subset of the reliability values. A first number of values in the first and the second subsets of reliability values is less than a second number of values in the RDS/RBDS candidate codeword.

23 Claims, 9 Drawing Sheets

U.S. PATENT DOCUMENTS

| | | | |
|---|---|---|---|
| 2007/0174755 A1* | 7/2007 | Lee et al. | 714/762 |
| 2009/0028250 A1* | 1/2009 | Taipale et al. | 375/259 |
| 2009/0270063 A1* | 10/2009 | Tuttle et al. | 455/333 |
| 2010/0080326 A1* | 4/2010 | Taipale et al. | 375/340 |
| 2011/0305304 A1* | 12/2011 | Yu et al. | 375/343 |

FOREIGN PATENT DOCUMENTS

| | | |
|---|---|---|
| EP | 0714184 A2 | 5/1996 |
| EP | 0746112 A2 | 12/1996 |
| EP | 0902564 A1 | 3/1999 |

OTHER PUBLICATIONS

International Search Report for PCT/US2008/082645 dated Sep. 9, 2009.

National Radio Systems Committee, "NRSC-4-A United States RBDS Standard, Specification of the radio broadcast data system", Apr. 2005, pp. 1-76. >>http://www.nrscstandards.org<<, NAB: 1771 N. St. NW, Washington, DC 20036.

"Concatenated Codes" by G. David Forney, Jr. 1966, pp. 35-55. Research Monograph No. 37, The M.I.T. Press, Cambridge, MA.

National Radio Systems Committee, "NRSC-4-A United States RBDS Standard, Specification of the radio broadcast data system", Part II—Annexes, Apr. 2005, pp. 73-78. >>http://www.nrscstandards.org<<, NAB: 1771 N. St. NW, Washington, DC 20036.

International Patent Application No. PCT/US2008/070765, "*International Search Report*," international filing date Jul. 22, 2008.

* cited by examiner

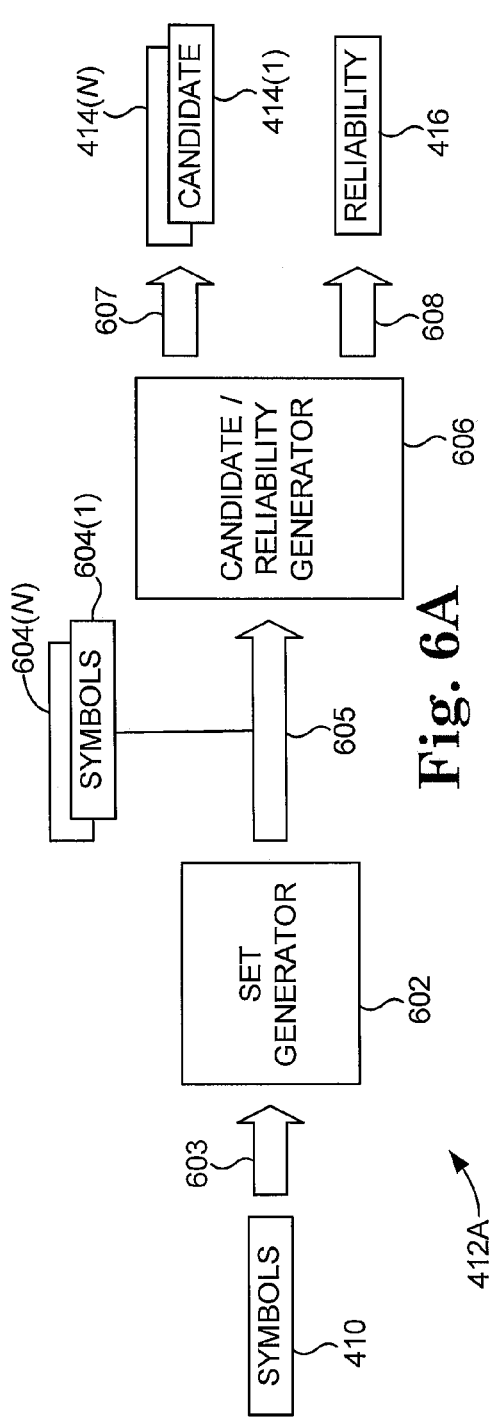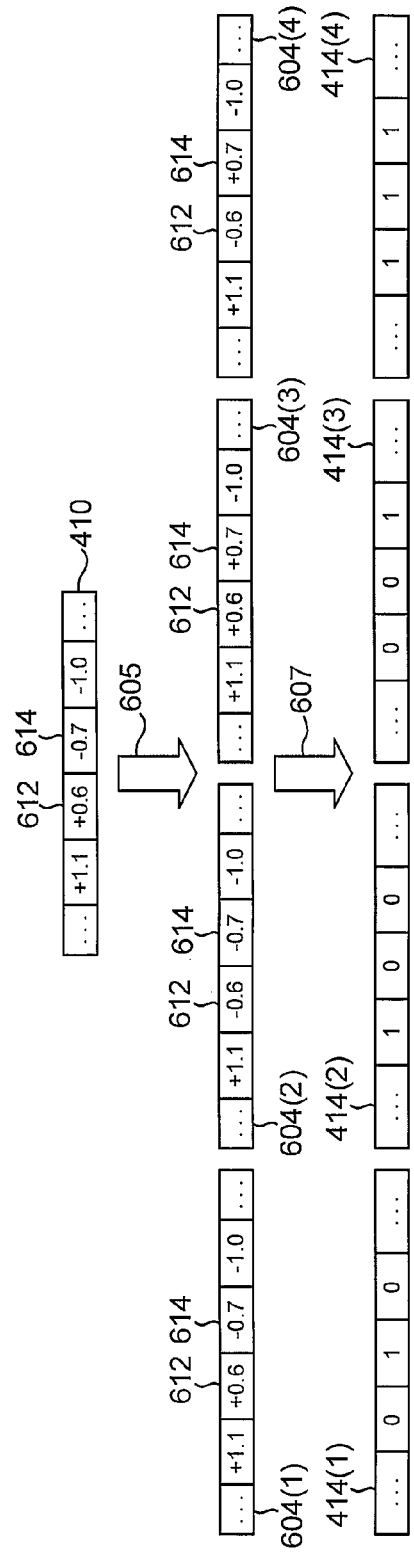
Fig. 6A
Fig. 6B
Fig. 6C
Fig. 6D

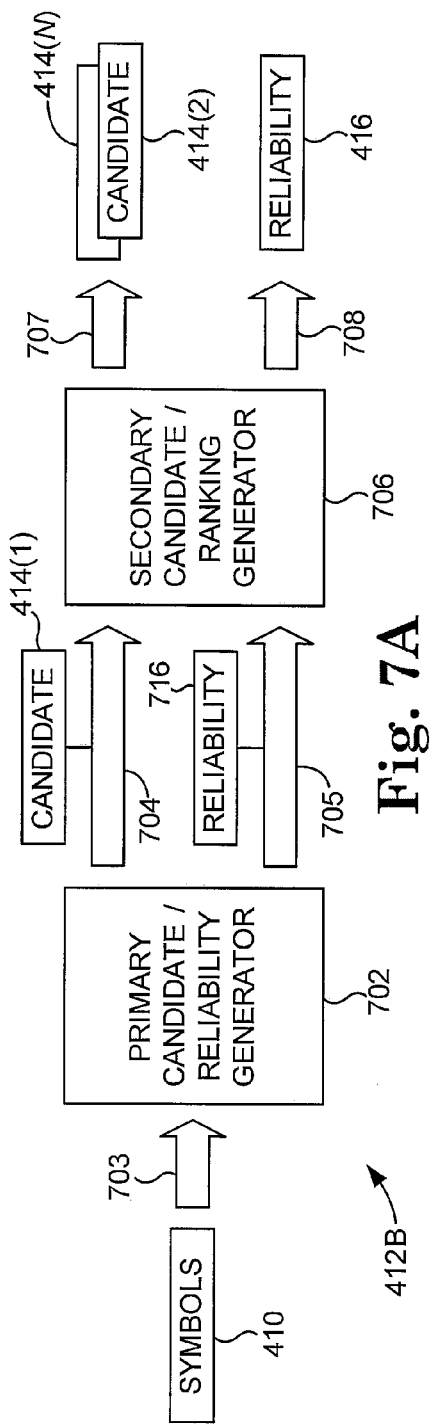
Fig. 7A
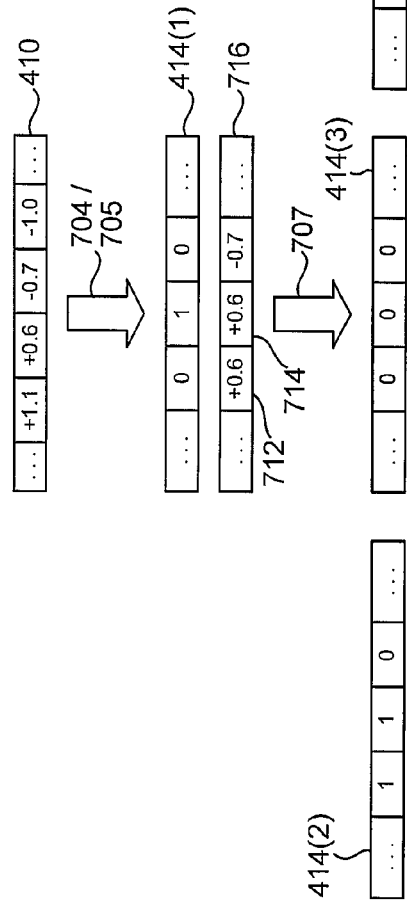
Fig. 7B
Fig. 7C
Fig. 7D

SYSTEM AND METHOD FOR DECODING RDS/RBDS DATA

BACKGROUND

Radio frequency (RF) receivers are used in a wide variety of applications such as cellular or mobile telephones, cordless telephones, personal digital assistants (PDAs), computers, radios and other devices that transmit or receive RF signals. RF receivers may be used to receive RDS (Radio Data System) and/or RBDS (Radio Broadcast Data System) information that is transmitted along with an AM or FM broadcast. Such RF receivers may display the RDS/RBDS data, which may include the name of a broadcast station and a description of broadcast content, for example, to a user.

RDS/RBDS data is generally transmitted with a relatively low amount of power. Because of the low power transmission, signal noise may interfere with an RDS/RBDS signal so that the bit-energy-to-noise-density ratio (Eb/N0) of RDS/RBDS data in an RDS/RBDS signal is relatively low. The low bit-energy-to-noise-density ratio may make the RDS/RBDS data difficult to reliably decode. It would be desirable to increase the reliability of decoded RDS/RBDS data.

SUMMARY

According to one exemplary embodiment, a method performed by a receiver is provided. The method comprises generating a first RDS/RBDS candidate codeword from a set of RDS/RBDS symbols, the first RDS/RBDS candidate codeword having a first subset of RDS/RBDS values that differs from corresponding subsets of RDS/RBDS values in all other possible RDS/RBDS codewords, and determining whether the first RDS/RBDS candidate codeword meets an acceptance criterion by comparing a first subset of reliability values determined from the set of RDS/RBDS symbols and having signs that differ from corresponding signs in the first subset of RDS/RBDS values with a second subset of reliability values determined from the set of RDS/RBDS symbols and mutually exclusive with the first subset of the reliability values. A first number of values in the first and the second subsets of reliability values is less than a second number of values in the first RDS/RBDS candidate codeword.

In another exemplary embodiment, a receiver is provided, The receiver comprises first circuitry configured to generate a first RDS/RBDS candidate codeword from a first set of RDS/RBDS symbols, the first RDS/RBDS candidate codeword having a first subset of RDS/RBDS values that differs from corresponding subsets of RDS/RBDS values in all other possible RDS/RBDS codewords, and second circuitry configured to apply an acceptance criterion that compares a first subset of reliability values determined from the first set of RDS/RBDS symbols and having sign values that differ from corresponding sign values in the subset of RDS/RBDS values with a second subset of reliability values determined from the first set of RDS/RBDS symbols and mutually exclusive with the first subset of the reliability values. A first number of values in the first and the second subsets of reliability values is less than a second number of values in the first RDS/RBDS candidate codeword.

In further exemplary embodiment, a program product is provided. The program product comprises a program executable by processing circuitry for causing a receiver to generate a plurality of RDS/RBDS candidate codewords from a set of RDS/RBDS symbols, each of the plurality of RDS/RBDS candidate codewords having a respective subset of RDS/RBDS values that differs from corresponding respective subsets of RDS/RBDS values in all other possible RDS/RBDS codewords and, for each of the plurality of RDS/RBDS candidate codewords, apply an acceptance criterion that compares a first subset of reliability values determined from the set of RDS/RBDS symbols and having signs that differ from corresponding signs in the respective subset of RDS/RBDS values with a second subset of reliability values determined from the set of RDS/RBDS symbols and mutually exclusive with the first subset of the reliability values. For each of the plurality of RDS/RBDS candidate codewords, a first number of values in the first and the second subsets of reliability values is less than a second number of values in the first RDS/RBDS candidate codeword. The program product also comprises a medium that stores the program so that the program is accessible by the processing circuitry.

In yet another exemplary embodiment, a system is provided. The system comprises a receiver configured to generate an RDS/RBDS candidate codeword from a set of RDS/RBDS symbols where the RDS/RBDS candidate codeword has a subset of RDS/RBDS values that differs from corresponding subsets of RDS/RBDS values in all other possible RDS/RBDS codewords and apply an acceptance criterion to the RDS/RBDS candidate codeword that compares a first subset of reliability values determined from the set of RDS/RBDS symbols and having signs that differ from corresponding signs in the subset of RDS/RBDS values with a second subset of reliability values determined from the set of RDS/RBDS symbols and mutually exclusive with the first subset of the reliability values, wherein a first number of values in the first and the second subsets of reliability values is less than a second number of values in the RDS/RBDS candidate codeword and a host coupled to the receiver. The receiver is configured to provide the RDS/RBDS candidate codeword as an RDS/RBDS output to the host in response to the RDS/RBDS candidate codeword meeting the acceptance criterion.

BRIEF DESCRIPTION OF THE DRAWINGS

FIGS. 6A-6D are block diagrams illustrating embodiments of a candidate generation unit.

FIGS. 7A-7D are block diagrams illustrating additional embodiments of a candidate generation unit.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As described herein, an integrated receiver is provided for use in receiving radio-frequency (RF) signals or signals from other frequency bands. The receiver includes an RDS/RBDS decoder that is configured to decode and output RDS (Radio Data System) and/or RBDS (Radio Broadcast Data System) information. The receiver receives RDS/RBDS data in groups with a predefined number of bits (e.g., 104 bits) that are defined by the RDS/RBDS standards.

In processing RDS/RBDS data, the receiver generates a set of two or more RDS/RBDS candidate codewords for each RDS/RBDS group. The receiver applies an acceptance criterion to each of the set of RDS/RBDS candidate codewords that is based on the reliability of one or more individual values in the group. If one or more RDS/RBDS candidate codewords meet the acceptance criterion, then the receiver outputs the RDS/RBDS candidate codeword that best meets the acceptance criterion for the group. If no RDS/RBDS candidate codeword meets the acceptance criterion for a set of RDS/RBDS symbols, then the receiver outputs a decoder failure indication for the group.

The receivers described herein may be used in a wide variety of integrated communications systems. Although terrestrial RF receivers, e.g., FM and AM receivers, are described herein, these receivers are presented by way of example. In other embodiments, other frequency bands may be used.

Figure 1A:
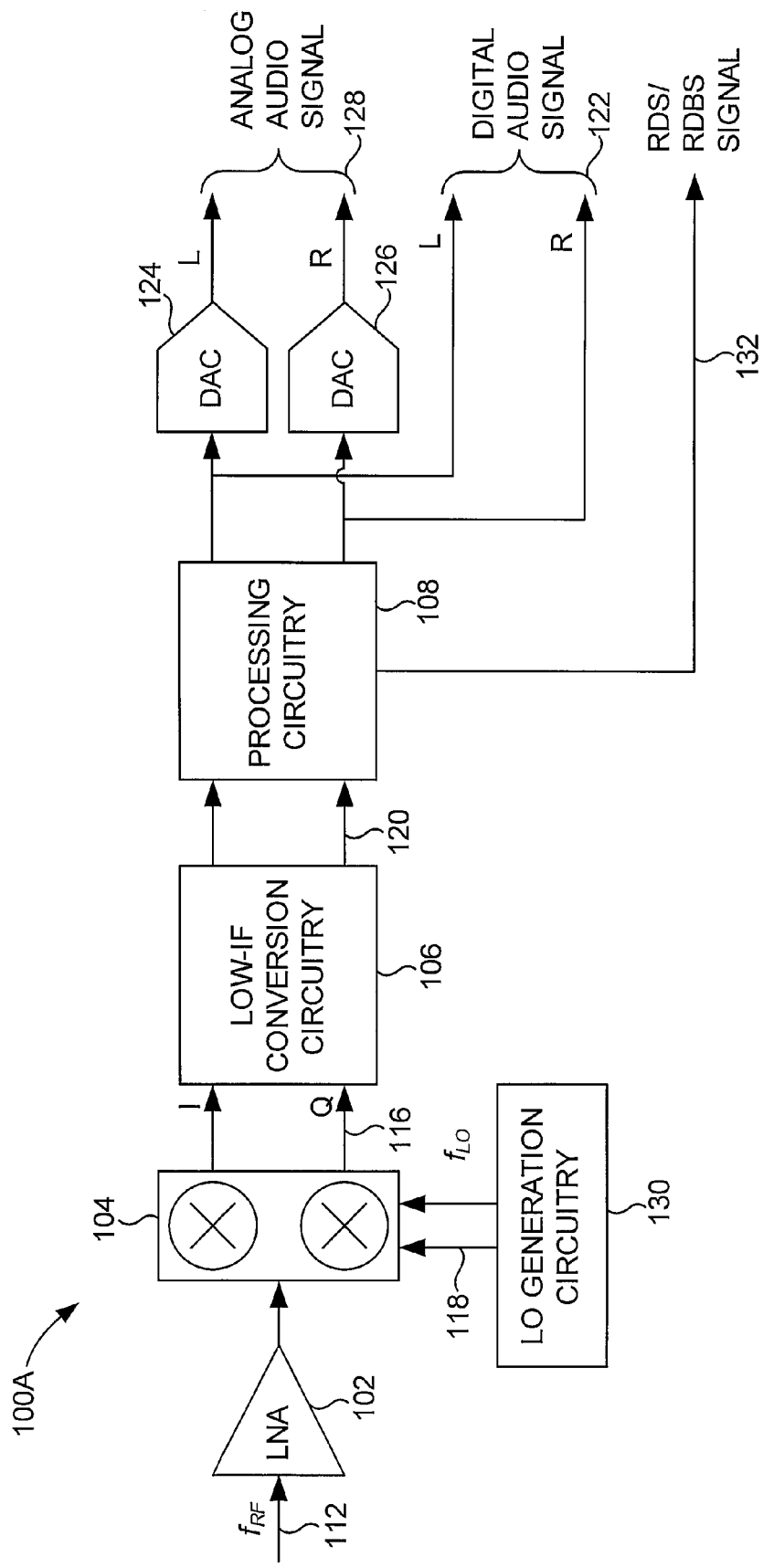
FIGS. 1A-1C are block diagrams illustrating embodiments of a low intermediate frequency (low-IF) receiver.

FIG. 1A is a block diagram illustrating one embodiment 100A of a low intermediate frequency (low-IF) receiver 100. Receiver 100A includes a low noise amplifier (LNA) 102, a mixer 104, low intermediate frequency (IF) conversion circuitry 106, processing circuitry 108, digital-to-analog converters 124 and 126, and local oscillator generation circuitry 130.

Receiver 100A is configured to receive a radio-frequency (RF) signal spectrum 112 and process signal spectrum 112 to generate a digital audio signal 122 and an analog audio signal 128 using a low intermediate frequency (IF) architecture. In one embodiment, receiver 100A forms an integrated terrestrial broadcast receiver configured to receive radio-frequency (RF) signals. As used herein, an RF signal means an electrical signal conveying useful information and having a frequency from about 3 kilohertz (kHz) to thousands of gigahertz (GHz), regardless of the medium through which the signal is conveyed. Thus, an RF signal may be transmitted through air, free space, coaxial cable, and/or fiber optic cable, for example. Accordingly, receiver 100A may receive signal spectrum 112 from a wired or wireless medium. In other embodiments, receiver 100A may be configured to receive signals 112 in another suitable frequency range.

In one embodiment, receiver 100A is configured as an AM/FM terrestrial broadcast receiver. In this embodiment, signal spectrum 112 includes the AM/FM terrestrial broadcast spectrum with a plurality of different AM and FM broadcast channels that are centered at different broadcast frequencies. In other embodiments, receiver 100A may be configured as a terrestrial broadcast receiver where signal spectrum 112 includes other terrestrial broadcast spectra with other channels.

LNA 102 receives RF signal spectrum 112 and generates an amplified output signal. The output of LNA 102 is then applied to mixer 104, and mixer 104 generates real (I) and imaginary (Q) output signals, as represented by signals 116. To generate low-IF signals 116, mixer 104 uses phase shifted local oscillator (LO) mixing signals 118. LO generation circuitry 130 includes oscillation circuitry (not shown) and outputs two out-of-phase LO mixing signals 118 that are used by mixer 104. The outputs of mixer 104 are at a low-IF which may be fixed or designed to vary, for example, if discrete step tuning for LO generation circuitry 130. An example of large step LO generation circuitry that utilizes discrete tuning steps is described in the co-owned and co-pending U.S. patent application Ser. No. 10/412,963, which was filed Apr. 14, 2003, which is entitled "RECEIVER ARCHITECTURES UTILIZING COARSE ANALOG TUNING AND ASSOCIATED METHODS," and which is hereby incorporated by reference in its entirety.

Low-IF conversion circuitry 106 receives the real (I) and imaginary (Q) signals 116 and outputs real and imaginary digital signals, as represented by signals 120. Low-IF conversion circuitry 106 preferably includes band-pass or low-pass analog-to-digital converter (ADC) circuitry that converts the low-IF input signals to the digital domain. Low-IF conversion circuitry 106 provides, in part, analog-to-digital conversion, signal gain, and signal filtering functions. Low-IF conversion circuitry 106 provides signals 120 to processing circuitry 108.

Processing circuitry 108 performs digital filtering and digital signal processing to further tune and extract the signal information from digital signals 120. Processing circuitry 108 produces baseband digital audio output signals 122. When the input signals relate to FM broadcasts, the digital processing provided by processing circuitry 108 may include, for example, FM demodulation and stereo decoding. Digital output signals 122 may include left (L) and right (R) digital audio output channels that represent the content of the FM broadcast channel being tuned. Processing circuitry 108 also provides the left and right digital audio output channels of signals 122 to DACs 124 and 126, respectively.

Processing circuitry 108 is further configured to generate and output RDS (Radio Data System) and/or RBDS (Radio Broadcast Data System) signals 132 from digital signals 120. RDS/RBDS signals 132 include RDS/RBDS data in a low data rate (i.e., 1187.5 bits/s) digital data stream that is transmitted at low deviation (i.e., ~2 kHz) along with target channel signals in the broadcast spectrum. RDS/RBDS data is transmitted and received in accordance with the international Radio Data System (RDS) standard IEC/CENELEC 62106 initially developed by the European Broadcasting Union (EBU) and/or the United States RBDS Standard, Specification of the radio broadcast data system (RBDS) published by the National Radio Systems Committee as NRSC-4-A and available from www.nrscstandards.org. Processing circuitry 108 tunes and decodes transmitted RDS/RBDS data from received digital signals 120 to generate the digital RDS/RBDS data stream. Processing circuitry 108 outputs the digital RDS/RBDS data stream as RDS/RBDS signal 132 either directly or across any suitable interface.

In processing RDS/RBDS data, processing circuitry 108 generates a set of two or more RDS/RBDS candidate codewords for each set of received RDS/RBDS symbols in signals 120. Processing circuitry 108 applies an acceptance criterion to each of the set of RDS/RBDS candidate codewords that is based on the reliability of one or more of each set of RDS/RBDS symbols. If one or more RDS/RBDS candidate codewords meet the acceptance criterion, then processing circuitry 108 outputs the RDS/RBDS candidate codeword that best meets the acceptance criterion in RDS/RBDS signals 132 for a set of RDS/RBDS symbols. If no RDS/RBDS candidate codeword meets the acceptance criterion for a set of RDS/RBDS symbols, then processing circuitry 108 outputs a decoder failure indication in RDS/RBDS signals 132 for the set of RDS/RBDS symbols.

DACs 124 and 126 receive the left and right digital audio output channels of signals 122, respectively, and convert digital signals 122 to analog audio output signals 128 with left and right analog audio output channels.

In other embodiments, the output of receiver 100A may be other desired signals, including, for example, low-IF quadrature I/Q signals from an analog-to-digital converter that are passed through a decimation filter, a baseband signal that has not yet be demodulated, multiplexed L+R and L−R audio signals, and/or any other desired output signals.

As used herein, low-IF conversion circuitry refers to circuitry that in part mixes the target channel within the input signal spectrum down to an IF that is equal to or below about three channel widths. For example, for FM broadcasts within the United States, the channel widths are about 200 kHz. Thus, broadcast channels in the same broadcast area are specified to be at least about 200 kHz apart. For the purposes of this description, therefore, a low IF frequency for FM broadcasts within the United States would be an IF frequency equal to or below about 600 kHz. It is further noted that for spectrums with non-uniform channel spacings, a low IF frequency would be equal to or below about three steps in the channel tuning resolution of the receiver circuitry. For example, if the receiver circuitry were configured to tune channels that are at least about 100 kHz apart, a low IF frequency would be equal to or below about 300 kHz. As noted above, the IF frequency may be fixed at a particular frequency or may vary within a low-IF ranges of frequencies, depending upon the LO generation circuitry utilized and how it is controlled.

For purposes of illustration, input signals 112 of receiver 100A described herein may be received in signal bands such as AM audio broadcast bands, FM audio broadcast bands, television audio broadcast bands, weather channel bands, or other desired broadcast bands. The following table provides example frequencies and uses for various broadcast bands that may be received by receiver 100A.

TABLE 1

EXAMPLE FREQUENCY BANDS AND USES

| FREQUENCY | USES/SERVICES |
|---|---|
| 150-535 kHz | European LW radio broadcast |
| | 9 kHz spacing |
| 535-1700 kHz | MW/AM radio broadcast |
| | U.S. uses 10 kHz spacing |
| | Europe uses 9 kHz spacing |
| 1.7-30 MHz | SW/HF international radio broadcasting |
| 46-49 MHz | Cordless phones, baby monitors, remote control |
| 59.75 (2) MHz | U.S. television channels 2-6 (VHF_L) |
| 65.75 (3) MHz | 6 MHz channels at 54, 60, 66, 76, 82 |
| 71.75 (4) MHz | Audio carrier is at 5.75 MHz (FM MTS) |
| 81.75 (5) MHz | |
| 87.75 (6) MHz | |
| 47-54 (E2) MHz | European television |
| 54-61 (E3) MHz | 7 MHz channels, FM sound |
| 61-68 (E4) MHz | Band I: E2-E4 |
| 174-181 (E5) MHz | Band II: E5-E12 |
| 181-188 (E6) MHz | |
| 188-195 (E7) MHz | |
| 195-202 (E8) MHz | |
| 202-209 (E9) MHz | |
| 209-216 (E10) MHz | |

TABLE 1-continued

EXAMPLE FREQUENCY BANDS AND USES

| FREQUENCY | USES/SERVICES |
|---|---|
| 216-223 (E11) MHz | |
| 223-230 (E12) MHz | |
| 76-91 MHz | Japan FM broadcast band |
| 87.9-108 MHz | U.S./Europe FM broadcast band |
| | 200 kHz spacing (U.S.) |
| | 100 kHz spacing (Europe) |
| 162.550 (WX1) MHz | U.S. Weather Band |
| 162.400 (WX2) MHz | 7 channels, 25 kHz spacing |
| 162.475 (WX3) MHz | SAME: Specific Area Message Encoding |
| 162.425 (WX4) MHz | |
| 162.450 (WX5) MHz | |
| 162.700 (WX6) MHz | |
| 162.525 (WX7) MHz | |
| 179.75 (7) MHz | U.S. television channels 7-13 (VHF_High) |
| | 6 MHz channels at 174, 180, 186, 192, 198, 204, 210 |
| 215.75 (13) MHz | FM Sound at 5.75 MHz |
| 182.5 (F5) MHz | French television F5-F10 Band III |
| | 8 MHz channels |
| 224.5 (F10) MHz | Vision at 176, 184, 192, 200, 208, 216 MHz |
| | AM sound at +6.5 MHz |
| 470-478 (21) MHz | Band IV - television broadcasting |
| | Band V - television broadcasting |
| 854-862 (69) MHz | 6 MHz channels from 470 to 862 MHz |
| | U.K. System I (PAL): |
| | Offsets of +/−25 kHz may be used to alleviate co-channel interference |
| | AM Vision carrier at +1.25 (Lower Sideband vestigial) |
| | FMW Sound carrier at +7.25 |
| | Nicam digital sound at +7.802 |
| | French System L (Secam): |
| | Offsets of +/−37.5 kHz may be used |
| | AM Vision carrier at +1.25 (inverted video) |
| | FMW Sound carrier at +7.75 |
| | Nicam digital sound at +7.55 |
| 470-476 (14) MHz | U.S. television channels 14-69 |
| | 6 MHz channels |
| 819-825 (69) MHz | Sound carrier is at 5.75 MHz (FM MTS) |
| | 14-20 shared with law enforcement |

Figure 1B:
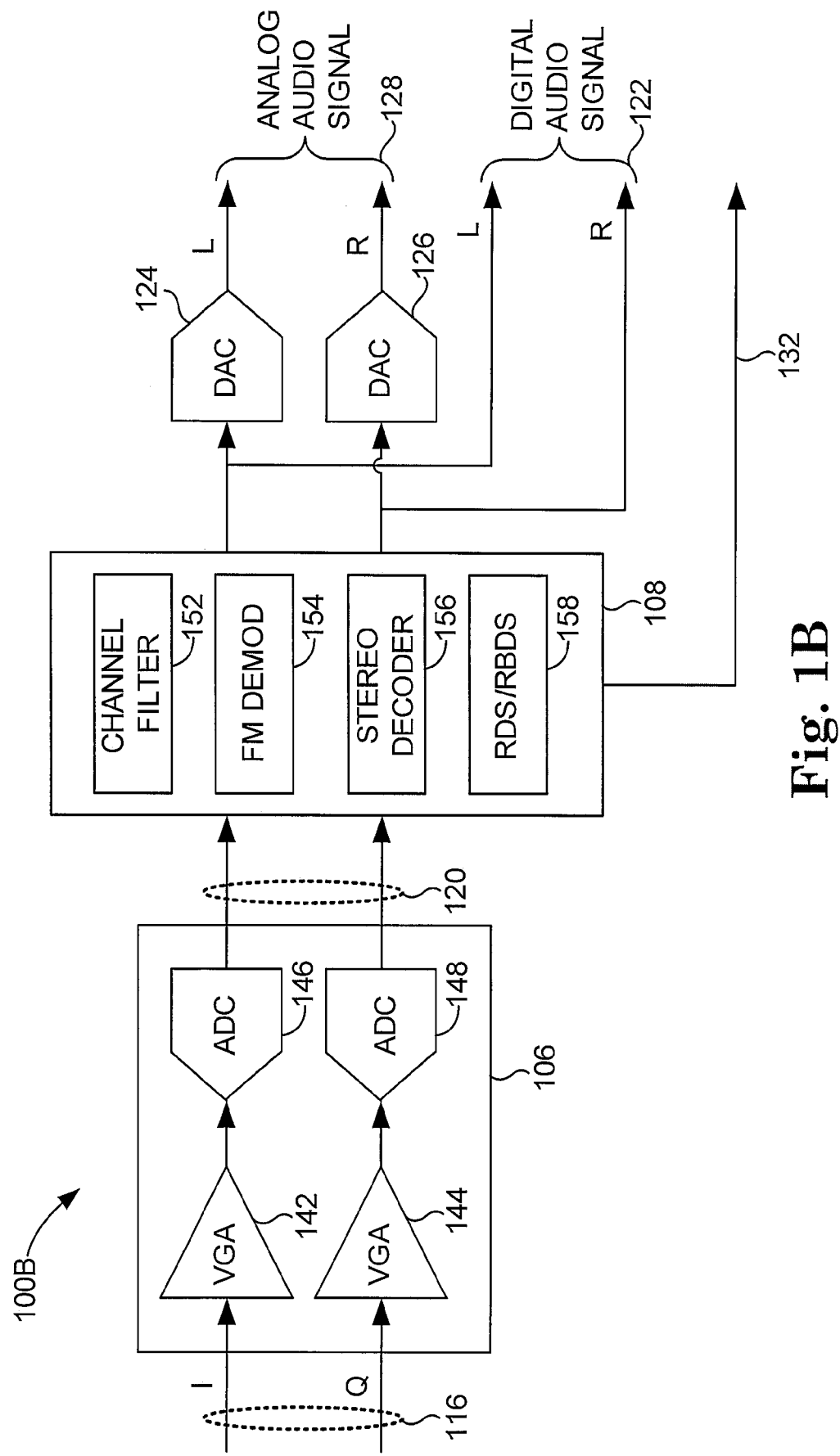

FIG. 1B is a block diagram illustrating one embodiment 100B of receiver 100. In receiver 100B, low-IF conversion circuitry 106 includes variable gain amplifiers (VGAs) 142 and 144 and analog-to-digital converters 146 and 148. Processing circuitry 108 includes an RDS/RBDS unit 158.

VGAs 142 and 144 receive the real (I) and imaginary (Q) signals 116, respectively, that have been mixed down to a low-IF frequency by mixer 104 and amplify signals 116. Band-pass ADC 146 converts the output of VGA 142 from low-IF to the digital domain to produce the real (I) portion of digital output signals 120, and band-pass ADC 148 converts the output of VGA 144 from low-IF to the digital domain to produce the imaginary (Q) portion of digital output signals 120. In other embodiments, ADCs 146 and 148 may be implemented as complex band-pass ADCs, real low-pass ADCs, or any other desired ADC architecture.

Processing circuitry 108 receives signals 120 from ADCs 146 and 148 and digitally processes signals 120 to further tune the target channel using a channel selection filter 152. Processing circuitry 108 may also provide FM demodulation of the tuned digital signals using a FM demodulator 154 and stereo decoding, such as MPX decoding, using a stereo decoder 156. In addition, processing circuitry 108 tunes, decodes, and outputs RDS/RBDS data using in part a RDS/RBDS decoder 158 within processing circuitry 108. Processing circuitry 108 outputs left (L) and right (R) digital audio signals 122. Integrated DACs 124 and 126 convert digital audio signals 122 to left (L) and right (R) analog audio signals 128.

Figure 2:
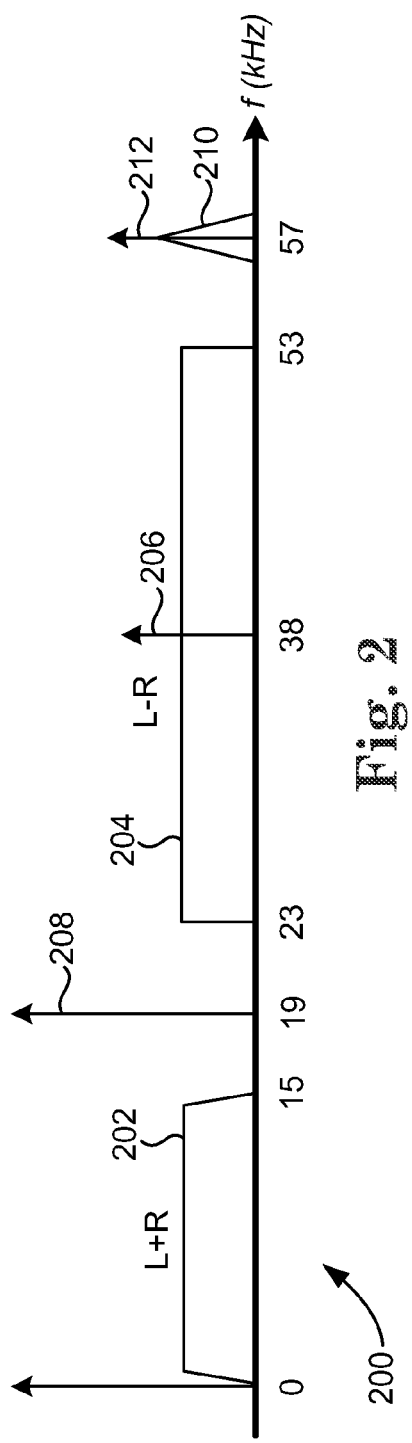
FIG. 2 is a graphical diagram illustrating one embodiment of a baseband spectrum for an FM stereo broadcast.

FIG. 2 is a graphical diagram illustrating one embodiment of a baseband spectrum 200 for an FM stereo broadcast target channel with left (L) and right (R) channels. In spectrum 200, a signal 202 from 30 Hz to 15 kHz includes the sum of the left and right stereo channels (L+R) and is transmitted as baseband audio. A signal 204 includes the difference between the left and right stereo channels (L−R). Signal 204 is amplitude-modulated onto a suppressed carrier 206 at 38 kHz to produce a double-sideband suppressed carrier (DSBSC) from 23 kHz to 53 kHz. A pilot tone 208 at 19 kHz is used by receiver 100B to generate carrier 206 with the correct phase. Spectrum 200 also includes an RDS/RBDS signal 210 from 55 kHz to 59 kHz and centered at a subcarrier 212 at 57 kHz (i.e., the third harmonic of pilot tone 208).

RDS/RBDS signal 210 represents a digital data stream of RDS/RBDS data. RDS/RBDS signal 210 is formed by differentially encoding the digital data stream using the encoding scheme shown in TABLE 1, converting differentially encoded signal to a biphase symbol signal, and mixing the biphase symbol signal with a 57 kHz subcarrier to form RDS/RBDS signal 210.

TABLE 1

| PREVIOUS OUTPUT (at time $t_{i-1}$) | CURRENT INPUT (at time $t_i$) | CURRENT OUTPUT (at time $t_i$) |
| --- | --- | --- |
| 0 | 0 | 0 |
| 0 | 1 | 1 |
| 1 | 0 | 1 |
| 1 | 1 | 0 |

Figure 3:
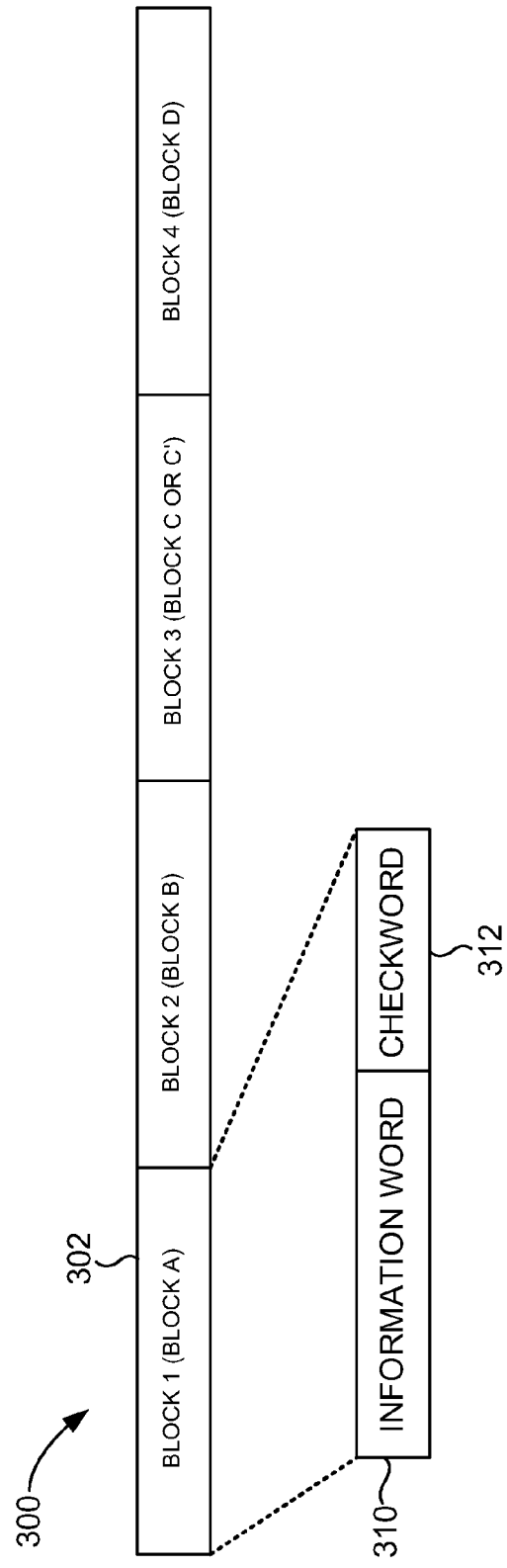
FIG. 3 is a block diagram illustrating one embodiment of an RDS/RBDS baseband coding structure.

RDS/RBDS signal 210 is transmitted using an RDS/RBDS baseband coding structure as shown in the embodiment of FIG. 3. The structure forms a group 300 of 104 bits with four blocks 302—blocks 1, 2, 3, and 4. Each of blocks 1, 2, 3, and 4 includes 26 bits where the first 16 bits form an information word 310 and the remaining 10 bits form a checkword 312 in each block 302. The bits of each group 300 are synchronously transmitted without gaps and the most significant bit of each block 302 is transmitted first.

Checkword 312 of block 1 includes an offset word A, checkword 312 of block 2 includes an offset word B, checkword 312 of block 3 includes an offset word C or C', and checkword 312 of block 4 includes an offset word D. Because offset words A, B, C or C', and D may be used to identify blocks 1, 2, 3, and 4, respectively, blocks 1, 2, 3, and 4 may also be referred to as blocks A, B, C or C', and D, respectively. Each checkword 312 is the sum (modulo 2) of a) the remainder after multiplication by $x^{10}$ and then division (modulo 2) by the generator polynomial g(x), of the 16-bit information word 310, b) a 10-bit binary string d(x), called the "offset word", where the generator polynomial, g(x) is given by Equation I:

$$g(x) = x^{10} + x^8 + x^7 + x^5 + x^4 + x^3 + 1 \qquad \text{Equation I}$$

and where the offset values, d(x), which are different for each block 302 within a group 300 are defined by the RBDS Standard.

Figure 4:
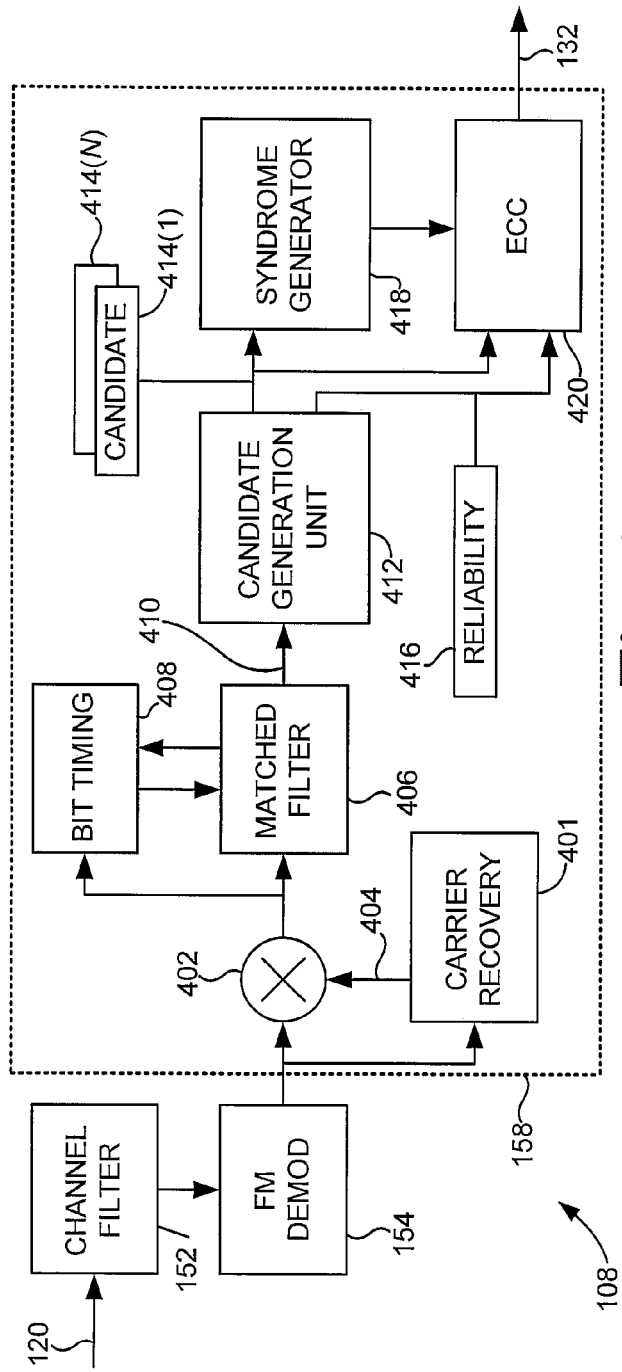
FIG. 4 is a block diagram illustrating one embodiment of an RDS/RBDS decoder.

FIG. 4 is a block diagram illustrating one embodiment of an RDS/RBDS decoder 158 in processing circuitry 108. In FIG. 4, channel selection filter 152 tunes the target channel of digital signals 120, and FM demodulator 154 performs FM demodulation on the tuned digital signals as noted above. FM demodulator 154 provides the tuned, demodulated signals to RDS/RBDS decoder 158.

RDS/RBDS decoder 158 receives the demodulated signals and outputs RDS/RBDS signals 132 in accordance with the demodulated signals. RDS/RBDS signals 132 include groups 300 that form RDS/RBDS codewords that are decoded from the demodulated signals by RDS/RBDS decoder 158.

To decode each RDS/RBDS codeword, RDS/RBDS decoder 158 generates a set of RDS/RBDS candidate codewords 414(1)-414(N), where N is an integer that is greater than or equal to two, for each set of RDS/RBDS symbols in the demodulated signals that are decodeable into a group 300. RDS/RBDS decoder 158 determines RDS/RBDS candidate codewords 414(1)-414(N) based on the reliability one or more of each set of RDS/RBDS symbols. RDS/RBDS decoder 158 also uses the reliability of one or more of each set of RDS/RBDS symbols to apply an acceptance criterion to each of the set of RDS/RBDS candidate codewords 414(1)-414(N). If one or more RDS/RBDS candidate codewords 414(1)-414(N) meet the acceptance criterion, then RDS/RBDS decoder 158 outputs the RDS/RBDS candidate codeword 414(1)-414(N) that best meets the acceptance criterion in RDS/RBDS signals 132 for the set of RDS/RBDS symbols. If no RDS/RBDS candidate codeword 414(1)-414(N) meets the acceptance criterion, then RDS/RBDS decoder 158 outputs a decoder failure indication in RDS/RBDS signals 132 for the set of RDS/RBDS symbols.

In RDS/RBDS decoder 158, a carrier recovery unit 401 receives the output of FM demodulator 154 and generates a 57 kHz mixing signal 404. A mixer 402 mixes the output of FM demodulator 154 with a 57 kHz mixing signal 404 to modulate the RDS signals in the output of FM demodulator 154 down to DC. Mixer 402 provides the demodulated RDS signals to a matched filter 406 and a bit timing unit 408. Matched filter 406 generates soft decision signals 410 by correlating the demodulated RDS signals with an expected pulse using bit timing signals generated and provided by bit timing unit 408. Matched filter 406 provides soft decision signals 410 to a candidate generation unit 412 and provides feedback to bit timing unit 408.

Referring to FIGS. 3 and 4, soft decision signals 410 include a continuous stream of biphase RDS/RBDS symbols that are decodable into successive groups 300 of 104 bit values where the 104 bit values includes blocks A, B, C or C', and D with 26 bits each. The symbols of soft decision signals 410 are each nominally either +1 or −1 but, due to noise, signal strength, or other factors, may vary from the nominal values. Each symbol is a real number and may be represented by a scaled 16-bit value in one embodiment.

Candidate generation unit 412 receives soft decision signals 410 from matched filter 406 and, for each group 300, generates RDS/RBDS candidate codewords 414(1)-414(N) and a set of reliability values 416.

Candidate generation unit 412 performs differential decoding on signals 410 to obtain a decoded sign value from each adjacent pair of symbols of signal 410.

In some embodiments, candidate generation unit 412 also determines a magnitude value from the magnitudes of the corresponding pair of symbols for each sign value. In one embodiment, candidate generation unit 412 determines the magnitude value to be equal to the magnitude of the least reliable magnitude value of the adjacent pair of symbols for each sign value. Because the symbols of signal 410 nominally vary between +1 and −1, candidate generation unit 412 determines the least reliable magnitude value of each adjacent pair of symbols to be the magnitude with the lowest absolute value (i.e., the value that is closest to zero). In other embodiments, candidate generation unit 412 may determine the magnitude value using another mathematical function for each adjacent pair of symbols for each sign value.

Figure 5:
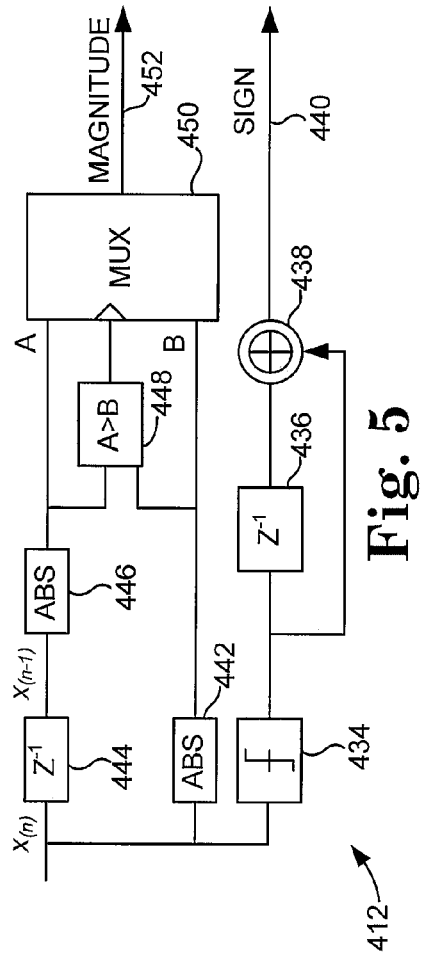
FIG. 5 is a block diagram illustrating one embodiment of a portion of a candidate generation unit.

FIG. 5 is a block diagram illustrating one embodiment of a portion of candidate generation unit 412 that determines the decoded sign and magnitude values from the symbols of signal 410.

In the embodiment of FIG. 5, candidate generation unit 412 determines each sign value from a corresponding adjacent pair of symbols, $x_{(n)}$ and $x_{(n-1)}$, in soft decision signals 410. A level detect unit 434 converts each symbol to a value of 0 if the symbols is greater than zero and to a value of 1 if the symbol is less than or equal to zero. An exclusive OR (XOR) unit 438 performs an exclusive OR operation to implement the decoding scheme shown in Table 2 on the current symbol from level detect unit 434 and the previous symbol from level detect unit 434, as provided by delay unit 436, to generate each sign value 440.

TABLE 2

| PREVIOUS INPUT $x_{(n-1)}$ (at time $t_{i-1}$) | CURRENT INPUT $x_{(n)}$ (at time $t_i$) | CURRENT OUTPUT (at time $t_i$) |
|---|---|---|
| 0 | 0 | 0 |
| 0 | 1 | 1 |
| 1 | 0 | 1 |
| 1 | 1 | 0 |

Candidate generation unit 412 also determines each magnitude value as the least reliable symbol, i.e., the symbol with the lowest absolute value, of a corresponding adjacent pair of symbols, $x_{(n)}$ and $x_{(n-1)}$, in soft decision signals 410. An absolute value unit 442 determines the absolute value of a current symbol, $x_{(n)}$. A delay unit 444 provides the previous symbol, $x_{(n-1)}$ to an absolute value unit 446 to determine the absolute value of the previous symbol, $x_{(n-1)}$. A comparator unit 448 compares the absolute values of the current and the previous symbols and causes the least reliable one to be provided by multiplexer 450 as a magnitude value 452.

Referring back to FIG. 4, candidate generation unit 412 generates RDS/RBDS candidate codewords 414(1)-414(N) and a set of reliability values 416 using the sign values and, in some embodiments, the magnitude values determined for each set of RDS/RBDS symbols.

In embodiments illustrated in FIGS. 6A-6D, candidate generation unit 412A includes a set generator 602 and a candidate/reliability generator 604. Set generator 602 receives a set of symbols in soft decision signals 410 as indicated by an arrow 603 and generates sets of symbols 604(1)-604(N) from the received set of symbols as indicated by an arrow 605 prior to the received set of symbols being decoded. To do so, set generator 602 identifies one or more least reliable symbols in the received set of symbols and generates each set of symbols 604(1)-604(N) with a different combination of signs of the least reliable symbols.

In the example shown in FIG. 6B, set generator 602 identifies symbols 612 and 614 in the received set of symbols as the least reliable symbols. Set generator 602 generates a first set of symbols 604(1) with the same set of signs and magnitudes as the received set of symbols. Set generator 602 also generates second, third, and fourth sets of symbols 604(2), 604(3), and 604(4) with different combination of signs of the least reliable symbols 612 and 614 as shown.

Candidate/reliability generator 604 receives the sets of symbols 604(1)-604(N) and generates a respective RDS/RBDS candidate codeword 414(1)-414(N) as indicated by an arrow 607 for each respective set of symbols 604(1)-604(N).

Candidate/reliability generator 604 differentially decodes each adjacent pair of symbols in each set of symbols 604 into a corresponding sign value (represented by 0 or 1) in a corresponding RDS/RBDS candidate codeword 414.

Candidate/reliability generator 604 also generates a set of reliability values 416 as indicated by an arrow 608. In one embodiment shown in FIG. 6C, candidate/reliability generator 604 generates a set of reliability values 416A with the same set of values as the set of symbols in soft decision signals 410. In another embodiment shown in FIG. 6D, candidate/reliability generator 604 generates a set of reliability values 416B that includes the least reliable signed magnitude value of each adjacent pair of symbols in each set of symbols 604. In other embodiments, candidate/reliability generator 604 generates the set of reliability values 416 in other suitable ways.

In additional embodiments illustrated in FIGS. 7A-7D, candidate generation unit 412B includes a primary candidate/reliability generator 702 and a secondary candidate/reliability generator 704. Primary candidate/reliability generator 702 receives a set of symbols in soft decision signals 410 as indicated by an arrow 703. Primary candidate/reliability generator 702 differentially decodes each adjacent pair of symbols in the received set of symbols 410 into a corresponding sign value (represented by 0 or 1) in an RDS/RBDS candidate codeword 414(1) as indicated by an arrow 704. Primary candidate/reliability generator 702 also includes the least reliable signed magnitude value of each adjacent pair of symbols in the received set of symbols 410 in a set of reliability values 716 as indicated by an arrow 705.

Secondary candidate/reliability generator 704 identifies one or more least reliable magnitude values in the set of reliability values 716 and generates additional RDS/RBDS candidate codewords 414(2)-414(4) with different combinations of sign values that correspond to the least reliable magnitude values in the set of reliability values 716 as indicated by an arrow 707. In the example shown in FIG. 7B, secondary candidate/reliability generator 704 generates RDS/RBDS candidate codewords 414(2)-414(4) with different combination of sign values that correspond to the least reliable magnitude values 712 and 714 in the set of reliability values 716.

Secondary candidate/reliability generator 704 also generates a set of reliability values 416 as indicated by an arrow 708. In one embodiment shown in FIG. 7C, secondary candidate/reliability generator 704 generates a set of reliability values 416C with the same set of values as the set of symbols in soft decision signals 410. In another embodiment shown in FIG. 7D, secondary candidate/reliability generator 704 generates a set of reliability values 416D that includes the set of reliability values 716 generated by primary candidate/reliability generator 702. In other embodiments, secondary candidate/reliability generator 704 generates the set of reliability values 416 in other suitable ways.

In other embodiments, candidate generation unit 412 generates candidate codewords 414(1)-414(N) and the set of reliability values 416 in other suitable ways.

Referring back to FIG. 4, candidate generation unit 412 provides candidate codewords 414(1)-414(N) to a syndrome generator 418 and an error correction code (ECC) unit 420. Candidate generation unit 412 also provides the set of reliability values 416 to ECC unit 420.

Syndrome generator 418 calculates a syndrome for each candidate codeword 414. Syndrome generator 418 calculates a syndrome by multiplying a block 302 of each candidate codeword 414 by a parity-check matrix as described in the RDS/RBDS standards. Syndrome generator 418 provides each candidate codeword 414 and a corresponding syndrome to ECC unit 420.

For each candidate codeword 414 and syndrome provided by syndrome generator 418, ECC unit 420 applies a block error correction code to each candidate codeword 414 and then applies acceptance criterion to each candidate codeword 414 to determine whether a codeword meets the criterion. If one or more candidate codewords 414 meet the criterion, the ECC unit 420 outputs the candidate codeword 414 that best meets the acceptance criterion in RDS/RBDS signals 132. If a candidate codeword 414 does not meet the criterion, then ECC unit 420 does not output the candidate codeword 414. If none of the candidate codewords 414 for a given group 300 meet the criterion, then ECC unit 420 does not output a candidate codeword 414 for that group 300 and indicates a decoder failure in RDS/RBDS signals 132.

The derivation of the acceptance criterion used by ECC unit 420 for each candidate codeword 414 in one embodiment will now be described. The following discussion assumes a given block of code of length n (e.g., 16 bits), a minimum Hamming distance d, a received vector $\alpha$, and two candidate codewords A and B (also vectors). The set of indices for the vectors $\alpha$, A, and B may be partitioned into four sets as shown in Equations II-V where all indices fall into one and only one of the sets.

$$S = \{i \ni A_i = B_i = sgn(\alpha_i)\} \quad \text{Equation II}$$

$$\hat{S} = \{i \ni A_i = B_i \neq sgn(\alpha_i)\} \quad \text{Equation III}$$

$$T = \{i \ni B_i \neq A_i = sgn(\alpha_i)\} \quad \text{Equation IV}$$

$$\hat{T} = \{i \ni A_i \neq B_i = sgn(\alpha_i)\} \quad \text{Equation V}$$

Figure 8A:
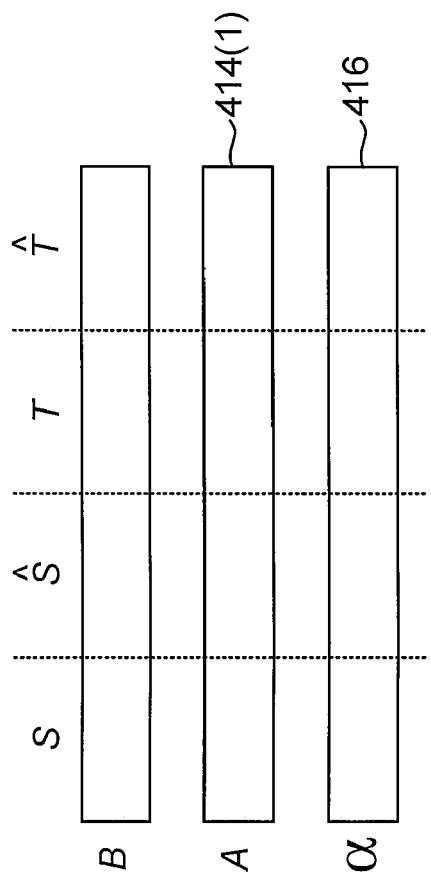
FIGS. 8A-8B are block diagrams illustrating one embodiment of acceptance criterion for candidate codewords generated using signal reliability information.

These sets are shown in FIG. 8A where candidate codeword A is a candidate codeword 414(1) and the received vector $\alpha$ is the set of reliability values 416. The values of vectors $\alpha$, A, and B are shown in FIG. 8A as grouped into the above sets S, $\hat{S}$, T, and $\hat{T}$ rather than in their logical order.

The acceptance criterion applied by ECC unit 420 is selected such that if a candidate codeword A meets the criterion, then it "matches" the received vector $\alpha$ better than any other codeword B could. For additive white Gaussian noise, the candidate codeword with the largest probability will have the closest Euclidean distance to the received vector $\alpha$, which corresponds to having the largest real dot product as shown in Equation VI where the max is taken over all codewords A.

$$\max_A A \cdot \alpha \quad \text{Equation VI}$$

A codeword is a vector of +/−1's formed by mapping the binary set $\{0,1\}$ to $\{1,-1\}$. The condition of Equation VI is the same as requiring the condition of Equation VII for all codewords B.

$$A \cdot \alpha > B \cdot \alpha \quad \text{Equation VII}$$

By splitting the dot product of Equation VII into sums over the sets from Equations II-V, an equivalent condition may be derived as shown in Equation VIII.

$$\sum_S A_i \alpha_i + \sum_{\hat{S}} A_i \alpha_i + \sum_T A_i \alpha_i + \sum_{\hat{T}} A_i \alpha_i > \quad \text{Equation VIII}$$

$$\text{-continued}$$
$$\sum_S B_i \alpha_i + \sum_{\hat{S}} B_i \alpha_i + \sum_T B_i \alpha_i + \sum_{\hat{T}} B_i \alpha_i$$

Because A and B agree in sign on sets S and $\hat{S}$, the S and $\hat{S}$ can be canceled in Equation VIII to derive Equation IX.

$$\sum_T A_i \alpha_i + \sum_{\hat{T}} A_i \alpha_i > \sum_T B_i \alpha_i + \sum_{\hat{T}} B_i \alpha_i \quad \text{Equation IX}$$

Because $A_i = -B_i$ on sets T and $\hat{T}$, the terms of Equation IX may be combined to derive Equation X.

$$2\left(\sum_T A_i \alpha_i + \sum_{\hat{T}} A_i \alpha_i\right) > 0 \quad \text{Equation X}$$

Equation XI may be derived from Equation X by removing the factor of 2 and moving the set $\hat{T}$ term to the right side.

$$\sum_T A_i \alpha_i > -\sum_{\hat{T}} A_i \alpha_i \quad \text{Equation XI}$$

Because $\hat{T}$ is the set where the codeword A disagrees with $\alpha$, each term in the set $\hat{T}$ sum is negative. Conversely, each term in the set T sum is positive because T is the set where the codeword A agrees with $\alpha$. Because the magnitude of each component of A is 1, Equation XI may be simplified to Equation XII.

$$\sum_T \alpha_i > \sum_{\hat{T}} \alpha_i \quad \text{Equation XII}$$

Because the code has a minimum Hamming distance of d, the combined size of the two sets T and $\hat{T}$ is at least d for any codewords A and B. With a candidate codeword A and a received vector $\alpha$, ECC unit 420 may use Equation XII as an acceptance criterion for candidate codeword A by assuming a worst case assignment of indices. By assuming a worst case assignment of indices, ECC unit 420 uses the criterion of Equation XII to accept codeword A only when codeword A is better than all possible candidate codewords B. Accordingly, ECC unit 420 may apply the acceptance criterion of Equation XII to a codeword A without the need to apply the criterion to all other possible codewords B.

To obtain a worst case assignment of indices, ECC unit 420 uses the harshest possible set T. Because candidate codeword A and the matched filter vector $\alpha$ are known, $\hat{T}$ is defined and the cardinality of the set of $\hat{T}$ is e. The set W may be defined to include the set of (d-e) least reliable (i.e., smallest magnitude) components of $\alpha$ that are not in set $\hat{T}$. If the condition in Equation XIII is true, then candidate codeword A is more probable than any other codeword B.

$$\sum_W \alpha_i > \sum_{\hat{T}} \alpha_i \quad \text{Equation XIII}$$

Accordingly, ECC unit 420 applies the condition in Equation XIII to a candidate codeword A as the acceptance criterion. If one or more candidate codewords A meet the acceptance criterion, then ECC unit 420 outputs the codeword that best meets the acceptance criterion in RDS/RBDS signals 132. If no candidate codeword A meets the acceptance criterion, the ECC unit 420 does not output a codeword and indicates a decoding failure in RDS/RBDS signals 132.

In embodiments where the set of reliability values 416 is the set of symbols in soft decision signals 410 (e.g., the embodiments described with reference to FIGS. 6C and 7C), ECC unit 420 differentially encodes candidate codewords 414 into respective sets of signed symbols and compares the signs of the differentially encoded candidate codewords 414 to the signs of the set of reliability values 416 to identify sets W and $\hat{T}$.

In embodiments where the set of reliability values 416 includes the least reliable signed magnitude value of each adjacent pair of symbols in the set of symbols in soft decision signals 410 (e.g., the embodiments described with reference to FIGS. 6D and 7D), ECC unit 420 compares the signs of candidate codewords 414 to the signs of the set of reliability values 416 to identify sets W and $\hat{T}$.

Figure 8B:
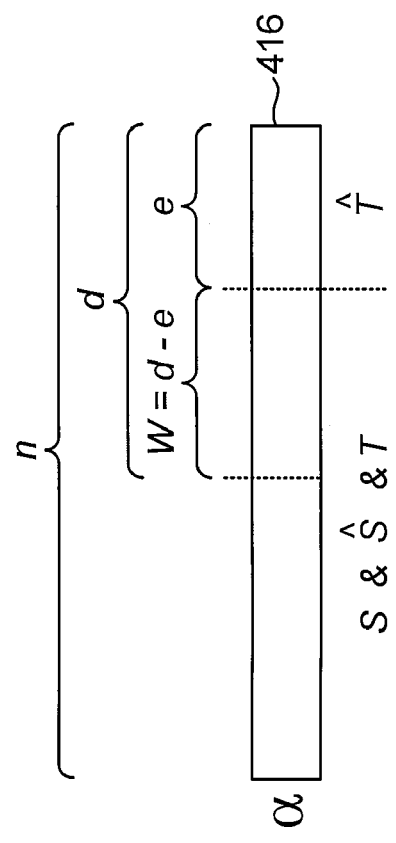

FIG. 8B further illustrates the acceptance criterion shown in Equation XIII. As noted above, the received vector $\alpha$, i.e., the set of reliability values 416, is a set of n reliability values. The received vector $\alpha$ includes a first subset of reliability values (i.e., the subset of $\alpha$ that is in $\hat{T}$) that have signs that differ from corresponding signs in the candidate codeword A but are the same as corresponding signs in all other possible RDS/RBDS codewords B. The received vector $\alpha$ also includes a second subset of reliability values (i.e., the subset of $\alpha$ that is not in $\hat{T}$) that is mutually exclusive with the first subset. The W least reliable members of this second subset of reliability values is summed on the left side of Equation XIII and the e members of the first subset of reliability values is summed on the right side of Equation XIII. The total number of values d in the first and the second subsets of reliability values is less than the total number of values n in the RDS/RBDS candidate codeword A.

For the case of RDS/RBDS decoding, the rationale for the acceptance criterion of Equation XIII may not be directly applicable because the RDS/RBDS code includes a burst error correcting capability for which the above rationale may not directly account. For some instances (including RDS/RBDS coding), this also can result in more than one candidate codeword meeting the acceptance criterion of Equation XIII. In this case, ECC unit 420 identifies the candidate codeword that best meets the acceptance criterion as the candidate codeword that maximizes the inequality of Equation XIII. ECC unit 420, however, applies the acceptance criterion of Equation XIII anyway and adjusts the parameter d to obtain the best performance rather than accept the value of t in the original design of the RDS/RBDS code. For example, a value of 7 for d may obtain the best performance in one embodiment. Using the above embodiments, the probability of correctly decoding (which increases as d as increased) may be traded off with the probability of decoding error (which also increases as d as increased).

Figure 1C:
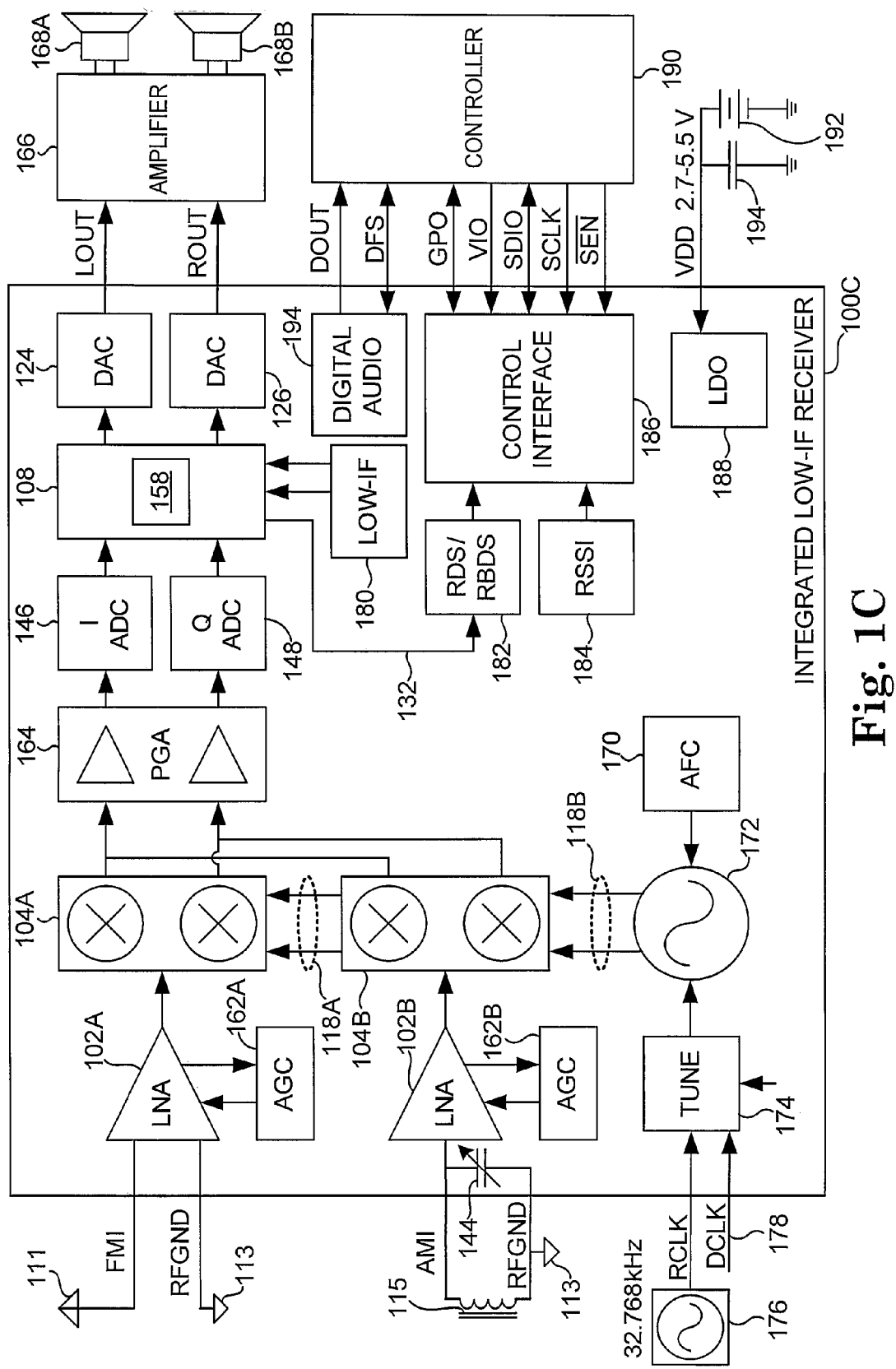

FIG. 1C is a block diagram illustrating one embodiment 100C of low-IF receiver 100. Receiver 100C forms an integrated terrestrial broadcast that is configured to receive FM and AM broadcasts. Receiver 100C includes an FM antenna 111 that provides a differential FM input signal, FMI, between antenna 111 and a ground connection, RFGND, 113, to an LNA 102A. Receiver 100C also includes an AM antenna 115 that provides a differential AM input signal, AMI, between antenna 115 and ground connection, RFGND, 113, to an LNA 102B. AM antenna 115 is a ferrite bar antenna, and the AM reception can be tuned using an on-chip variable capacitor circuit 144. FM antenna 111 reception may also be tuned with an on-chip variable capacitor circuit (not shown), if desired. An integrated supply regulator (LDO) block 188 regulates the on-chip power using a supply voltage, VDD (2.7-5.5 V), from a power supply 192 across a capacitor 194.

LNAs 102A and 102B operate in conjunction with automatic gain control (AGC) blocks 162A and 162B, respectively, and provide output signals to mixers 104A and 104B, respectively. Mixers 104A and 104B process the respective signals and each generate real (I) and an imaginary (Q) signals. Mixers 104A and 104B each provide the real (I) and an imaginary (Q) signals to a programmable gain amplifier (PGA) 164. Receiver 100C operates such that only one of mixers 104A and 104B provides signals to PGA 164 at a time. PGA 164 processes the signals from mixers 104A and 104B to generate output signals. The output signals from PGA 164 are then converted to digital I and Q values with I-path ADC 146 and Q-path ADC 148.

Processing circuitry 108 then processes the digital I and Q values to produce left (L) and right (R) digital audio output signals and provides the digital audio output signals to digital audio block 194. Digital audio block 194 provides the digital audio output signals (DOUT) to controller 190 and communicates with controller 190 using a DFS signal. In addition, these left (L) and right (R) digital audio output signals are processed by DAC circuits 124 and 126 to produce left (LOUT) and right (ROUT) analog output signals. These analog output signals are output to listening devices, such as headphones or speakers. Amplifier 166 and speaker outputs 168A and 168B, for example, may represent headphones or speakers for listening to the analog audio output signals. As described above, processing circuitry 108 provides a variety of processing features, including digital filtering, FM and AM demodulation (DEMOD) and stereo/audio decoding, such as MPX decoding. Low-IF block 180 includes additional circuitry utilized to control the operation of processing circuitry 108 in processing the digital I/Q signals.

Receiver 100C also includes a digital control interface 186 to communicate with external devices, such as controller 190. The digital communication interface between control interface 186 and controller 190 includes a bi-directional GPO signal, a VIO signal, a bi-directional serial data input/output (SDIO) signal, a serial clock input (SCLK) signal, and a serial interface enable (SEN_) input signal. In addition, control and/or data information is provided through interface 186 to and from external devices, such as controller 192. For example, a RDS/RBDS block 182 reports relevant RDS/RBDS data from RDS/RBDS decoder 158 in processing circuitry 108 through control interface 186. A receive signal strength indicator block (RSSI) 184 analyzes the received signal and reports data concerning the strength of the signal through control interface 186. In other embodiments, other communication interfaces may be used, if desired, including serial or parallel interfaces that use synchronous or asynchronous communication protocols.

An external oscillator 176, operating, for example, at 32.768 kHz, provides a fixed reference clock signal to a tune block 174 through an RCLK connection. Tune block 174 also receives a DCLK signal 178. Tune block 174 generates a reference frequency and provides the reference frequency to a frequency synthesizer 172. An automatic frequency control (AFC) block 170 receives a tuning error signal from the receive path circuitry within receiver 100C and provide a correction control signal to frequency synthesizer 172.

Frequency synthesizer 172 receives the reference frequency from tuning block 174 and the correction control signal from AFC block 170. Frequency synthesizer 172 generates two mixing signals that are 90 degrees out of phase with each other and provides the mixing signals to mixers 104A and 104B as signals 118A and 118B, respectively.

In other embodiments, receivers 100A, 100B, and 100C may be combined with transmitter circuitry to form transceivers 100A, 100B, and 10° C.

Figure 9:
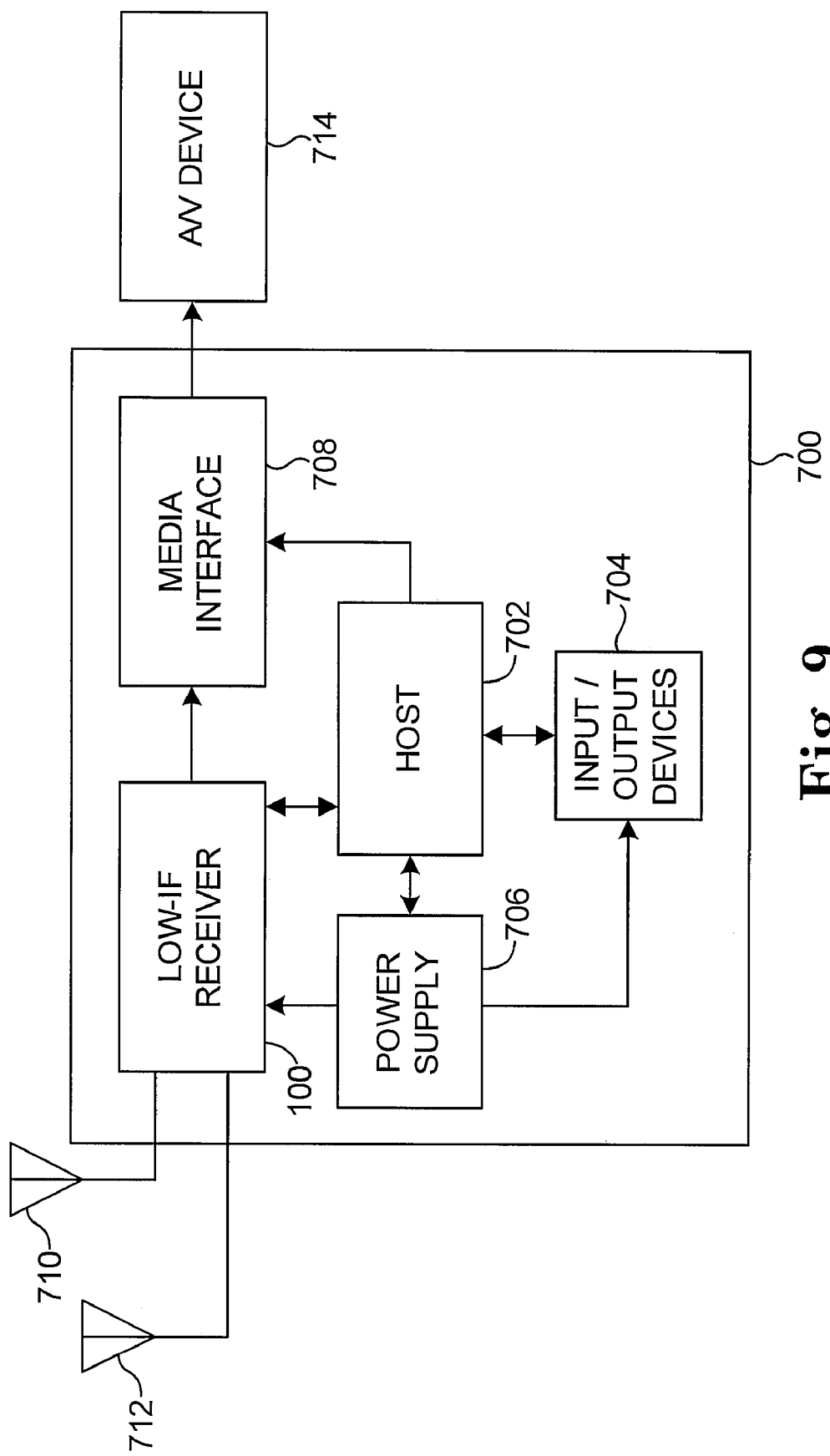
FIG. 9 is a block diagram illustrating one embodiment of a device that includes a low-IF receiver.

FIG. 9 is a block diagram illustrating one embodiment of a device 700 that includes low-IF receiver 100. Device 700 may be any type of portable or non-portable electronic device such as a mobile or cellular telephone, a personal digital assistant (PDA), an audio and/or video player (e.g., an MP3 or DVD player), an audio and/or video system (e.g., a television or stereo system), a wireless telephone, a desktop or laptop computer, or a peripheral card (e.g., a USB card) that couples to a computer. Device 700 includes low-IF receiver 100, a host 702, one or more input/output devices 704, a power supply 706, a media interface 708, an FM antenna 710, an AM antenna 712, and an audio/video (A/V) device 714, among other components.

Low-IF receiver 100 receives broadcast signals using antenna 710 and antenna 712, processes the signals as described above, provides digital audio signals to host 702, and provides analog audio signals to audio output interface 708. Low-IF receiver 100 selects a broadcast channel in response to channel selection inputs from host 702.

Host 702 provides channel selection inputs and other control inputs to low-IF receiver 100. Host 702 receives the digital audio signals from low-IF receiver 100, processes the digital audio signals, and provides the processed signals in a digital or audio format to media interface 708. Host 702 may provide control inputs to media interface 708 to select the audio signals that are output by media interface 708. Host 702 also receives RDS/RBDS data from receiver 100 and provides the RDS/RBDS data to input/output devices 704. Host 702 may also provide visual information to media interface 708 for display to a user.

Input/output devices 704 receive information from a user and provide the information to host 702. Input/output devices 704 also receive information from host 702 and provide the information to a user. The information may include RDS/RBDS data, channel selection information, voice and/or data communications, audio, video, image, or other graphical information. Input/output devices 704 include any number and types of input and/or output devices to allow a user provide information to and receive information from device 700. Examples of input and output devices include a microphone, a speaker, a keypad, a pointing or selecting device, and a display device.

Power supply 706 provides power to low-IF receiver 100, host 702, input/output devices 704, and media interface 708. Power supply 706 includes any suitable portable or non-portable power supply such as a battery or an AC plug.

Media interface 708 provides at least one digital or analog audio signal stream to A/V device 714. A/V device 714 broadcasts the audio signal to a user. A/V device 714 may be any suitable audio broadcast device such as headphones or speakers. A/V device 714 may also include an amplifier or other audio signal processing devices. A/V device 714 may further include any suitable video device configured to display information from host.

In the above embodiments, at least LO generation circuitry 130, mixer 104, low-IF conversion circuitry 106 and processing circuitry 108 may be located on-chip and integrated on the same integrated circuit (i.e., on a single chip that is formed on a common substrate). In addition, any of LNA 102, LNA 102A, and LNA 102B and other desired circuitry may also be integrated into the same integrated circuit. An antenna that couples to LNAs 102, 102A, or 102B (such as antennas 111 and 115 in FIG. 1C or antennas 710 and 712 in FIG. 9) may be located off-chip (i.e., external to the common substrate that includes receiver 100). In other embodiments, other components of receiver 100 may be located off-chip.

In the above embodiments, processing circuitry 108 includes hardware, software, firmware, or a combination of these. In one embodiment, components of processing circuitry 108, such as RDS/RBDS decoder 158, may form a program product with instructions that are accessible to and executable by processing circuitry 108 to perform the functions of processing circuitry described above. The program product may be stored in any suitable storage media that is readable by processing circuitry 108. The storage media may be within or external to processing circuitry 108.

In the above embodiments, a variety of circuit and process technologies and materials may be used to implement the receivers described above. Examples of such technologies include metal oxide semiconductor (MOS), p-type MOS (PMOS), n-type MOS (NMOS), complementary MOS (CMOS), silicon-germanium (SiGe), gallium-arsenide (GaAs), silicon-on-insulator (SOI), bipolar junction transistors (BJTs), and a combination of BJTs and CMOS (BiCMOS).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a receiver integrated circuit, the method comprising:

receiving radio-frequency (RF) signals with receiver circuitry within a receiver integrated circuit, the RF signals including Radio Data System/Radio Broadcast Data System (RDS/RBDS) information;

converting the RF signals to digital signals within the receiver integrated circuit;

processing the digital signals with processing circuitry within the receiver integrated circuit to generate a set of RDS/RBDS candidate codewords from a set of RDS/RBDS symbols, a first one of the set of RDS/RBDS candidate codewords having a first subset of RDS/RBDS values that differs from corresponding subsets of RDS/RBDS values in all other RDS/RBDS candidate codewords in the set of RDS/RBDS candidate codewords; and determining with the processing circuitry whether the first one of the set of RDS/RBDS candidate codewords meets an acceptance criterion by comparing a first subset of reliability values determined from the set of RDS/RBDS symbols and having sign values that differ from corresponding sign values in the first subset of RDS/RBDS values with a second subset of reliability values determined from the set of RDS/RBDS symbols and mutually exclusive with the first subset of the reliability values; and wherein a first number of values in the first and the second subsets of reliability values is less than a second number of values in the first one of the set of RDS/RBDS candidate codewords.

2. The method of claim 1 further comprising:
determining with the processing circuitry that the first one of the set of RDS/RBDS candidate codewords meets the acceptance criterion in response to a sum of magnitudes of the second subset of the reliability values being greater than a sum of magnitude values of the first subset of the reliability values.

3. The method of claim 2 further comprising:
outputting the first one of the set of RDS/RBDS candidate codewords in response to the first one of the set of RDS/RBDS candidate codewords meeting the acceptance criterion.

4. The method of claim 1
wherein a second one of the set of RDS/RBDS candidate codewords has a second subset of RDS/RBDS values that differs from corresponding subsets of RDS/RBDS values in all other RDS/RBDS candidate codewords in the set of RDS/RBDS candidate codewords; and
determining with the processing circuitry whether the second one of the set of RDS/RBDS candidate codewords meets the acceptance criterion by comparing a third subset of reliability values determined from the set of RDS/RBDS symbols and having sign values that differ from corresponding sign values in the second subset of RDS/RBDS values with a fourth subset of reliability values determined from the set of RDS/RBDS symbols and mutually exclusive with the third subset of the reliability values;
wherein a third number of values in the third and the fourth subsets of reliability values is less than the second number of values in the first one of the set of RDS/RBDS candidate codewords.

5. The method of claim 4 further comprising:
outputting the first one of the set of RDS/RBDS candidate codewords in response to the first one of the set of RDS/RBDS candidate codewords meeting the acceptance criterion; and
outputting the second one of the set of RDS/RBDS candidate codewords in response to the second one of the set of RDS/RBDS candidate codewords meeting the acceptance criterion.

6. The method of claim 1 wherein the second subset of reliability values includes a subset of least reliable values from a set of reliability values that are not in the first subset of reliability values.

7. The method of claim 1 wherein each respective sign in the first subset of RDS/RBDS values is a first value in response to sign values of a respective pair of symbols in the set of RDS/RBDS symbols being equal and a second value in response to sign values of the respective pair of symbols not being equal.

8. The method of claim 1 wherein each respective magnitude in the first and the second subsets of reliability values is equal to a least reliable symbol of a respective pair of RDS/RBDS symbols in the set of RDS/RBDS symbols.

9. The method of claim 7 wherein each respective sign in the first and the second subsets of reliability values is a first value in response to sign values of a respective pair of symbols in the set of RDS/RBDS symbols being equal and a second value in response to sign values of the respective pair of symbols not being equal.

10. A receiver comprising:
receiver circuitry configured to receive radio-frequency (RF) signals and convert the RF signals to digital signals; and
processing circuitry including hardware configured to process the digital signals to:
generate a set of RDS/RBDS candidate codewords from a first set of RDS/RBDS symbols, a first one of the set of RDS/RBDS candidate codewords having a first subset of RDS/RBDS values that differs from corresponding subsets of RDS/RBDS values in all other RDS/RBDS candidate codewords in the set of RDS/RBDS candidate codewords; and
apply an acceptance criterion that compares a first subset of reliability values determined from the first set of RDS/RBDS symbols and having sign values that differ from corresponding sign values in the subset of RDS/RBDS values with a second subset of reliability values determined from the first set of RDS/RBDS symbols and mutually exclusive with the first subset of the reliability values; and
wherein a first number of values in the first and the second subsets of reliability values is less than a second number of values in the first one of the set of RDS/RBDS candidate codewords.

11. The receiver of claim 10 wherein the hardware is configured to process the digital signals to determine that the first one of the set of RDS/RBDS candidate codewords meets the acceptance criterion in response to a sum of magnitudes of the second subset of the reliability values being greater than a sum of magnitude values of the first subset of the reliability values.

12. The receiver of claim 10 wherein a second one of the set of RDS/RBDS candidate codewords having a second subset of RDS/RBDS values that differs from corresponding subsets of RDS/RBDS values in all other RDS/RBDS candidate codewords in the set of RDS/RBDS candidate codewords, wherein the hardware is configured to process the digital signals to apply the acceptance criterion that compares a third subset of reliability values determined from the set of RDS/RBDS symbols and having sign values that differ from corresponding sign values in the second subset of RDS/RBDS values with a fourth subset of reliability values determined from the set of RDS/RBDS symbols and mutually exclusive with the third subset of the reliability values, and wherein a third number of values in the third and the fourth subsets of reliability values is less than the second number of values in the first one of the set of RDS/RBDS candidate codewords.

13. The receiver of claim 10 wherein the hardware is configured to process the digital signals to output the first one of the set of RDS/RBDS candidate codewords in response to the first one of the set of RDS/RBDS candidate codewords meeting the acceptance criterion, and wherein the hardware is configured to process the digital signals to output the second one of the set of RDS/RBDS candidate codewords in response to the second one of the set of RDS/RBDS candidate codewords meeting the acceptance criterion.

14. The receiver of claim 10 wherein the second subset of reliability values includes a subset of least reliable values from a set of reliability values that are not in the first subset of reliability values.

15. The receiver of claim 10 wherein each respective magnitude in the first and the second subsets of reliability values is equal to a least reliable symbol of a respective pair of RDS/RBDS symbols in the set of RDS/RBDS symbols.

16. The receiver of claim 15 wherein each respective sign in the first and the second subsets of reliability values is a first value in response to sign values of a respective pair of symbols in the set of RDS/RBDS symbols being equal and a second value in response to sign values of the respective pair of symbols not being equal.

17. A program product comprising:
a program executable by processing circuitry for causing a receiver to:
generate a plurality of Radio Data System/Radio Broadcast Data System (RDS/RBDS) candidate codewords from a set of RDS/RBDS symbols, each of the plurality of RDS/RBDS candidate codewords having different respective subsets of RDS/RBDS values; and
for each of the plurality of RDS/RBDS candidate codewords, apply an acceptance criterion that compares a first subset of reliability values determined from the set of RDS/RBDS symbols and having sign values that differ from corresponding sign values in the respective subset of RDS/RBDS values with a second subset of reliability values determined from the set of RDS/RBDS symbols and mutually exclusive with the first subset of the reliability values; and
wherein, for each of the plurality of RDS/RBDS candidate codewords, a first number of values in the first and the second subsets of reliability values is less than a second number of values in the first RDS/RBDS candidate codeword; and
a non-transitory medium that stores the program so that the program is accessible by the processing circuitry.

18. The program product of claim 17 wherein the program is executable by the processing circuitry for causing the processing circuitry to determine that one of the plurality of RDS/RBDS candidate codewords meets the acceptance criterion in response to a sum of magnitudes of the second subset of the reliability values being greater than a sum of magnitude values of the first subset of the reliability values.

19. The program product of claim 18 wherein the program is executable by the processing circuitry for causing the processing circuitry to output the one of the plurality of RDS/RBDS candidate codewords that meets the acceptance criterion.

20. The program product of claim 17 wherein the program is executable by the processing circuitry for causing the processing circuitry to output a decoder failure indication in response to none of the plurality of RDS/RBDS candidate codewords meeting the acceptance criterion.

21. A system comprising:
a receiver configured to generate a set of Radio Data System/Radio Broadcast Data System (RDS/RBDS) candidate codewords from a set of RDS/RBDS symbols wherein one of the set of RDS/RBDS candidate codewords has a subset of RDS/RBDS values that differs from corresponding subsets of RDS/RBDS values in all other RDS/RBDS candidate codewords in the set of RDS/RBDS candidate codewords and apply an acceptance criterion to the RDS/RBDS candidate codeword that compares a first subset of reliability values determined from the set of RDS/RBDS symbols and having sign values that differ from corresponding sign values in the subset of RDS/RBDS values with a second subset of reliability values determined from the set of RDS/RBDS symbols and mutually exclusive with the first subset of the reliability values, wherein a first number of values in the first and the second subsets of reliability values is less than a second number of values in the one of the set of RDS/RBDS candidate codewords; and
a host coupled to the receiver;
wherein the receiver is configured to provide the one of the set of RDS/RBDS candidate codewords as an RDS/RBDS output to the host in response to the one of the set of RDS/RBDS candidate codewords meeting the acceptance criterion.

22. The system of claim 21 wherein the receiver is configured to determine that the one of the set of RDS/RBDS candidate codewords meets the acceptance criterion in response to a sum of magnitudes of the second subset of the reliability values being greater than a sum of magnitude values of the first subset of the reliability values.

23. The system of claim 21 wherein the second subset of reliability values includes a subset of least reliable values from a set of reliability values that are not in the first subset of reliability values.

* * * * *